(No Model.) 2 Sheets—Sheet 1.

T. B. JEFFERY.
VELOCIPEDE.

No. 383,131. Patented May 22, 1888.

Witnesses
Francis W. Parker.
Cora L. Cadwallader.

Inventor
Thomas B. Jeffery.
By Burton & Burton.
His Attorneys.

(No Model.) 2 Sheets—Sheet 2.
T. B. JEFFERY.
VELOCIPEDE.
No. 383,131. Patented May 22, 1888.
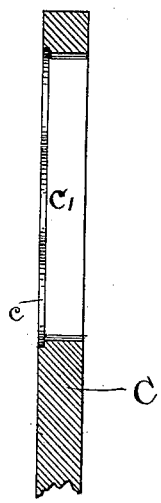
Fig. 10.
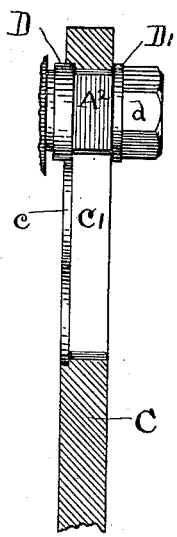
Fig. 11.
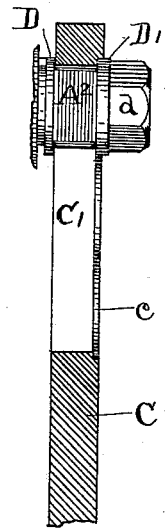
Fig. 12.
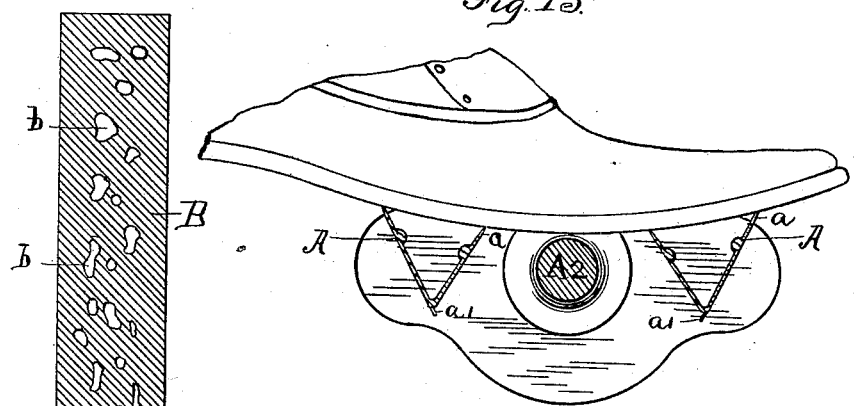
Fig. 15.
Fig. 13.
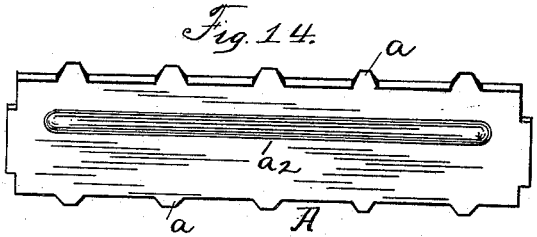
Fig. 14.
Witnesses—
Francis W. Parker.
Cora L. Cadwallader.
Inventor—
Thomas B. Jeffery.
By Burton & Burton.
His Attorneys.
N. PETERS, Photo-Lithographer, Washington, D. C.

UNITED STATES PATENT OFFICE.

THOMAS B. JEFFERY, OF RAVENSWOOD, ILLINOIS.

VELOCIPEDE.

SPECIFICATION forming part of Letters Patent No. 383,131, dated May 22, 1888.

Application filed October 15, 1887. Serial No. 252,411. (No model.)

*To all whom it may concern:*

Be it known that I, THOMAS B. JEFFERY, a citizen of the United States, residing at Ravenswood, county of Cook, State of Illinois, have invented certain new and useful Improvements in Velocipedes, which are set forth in the accompanying specification, reference being had to the accompanying drawings, forming a part thereof.

Figure 1:
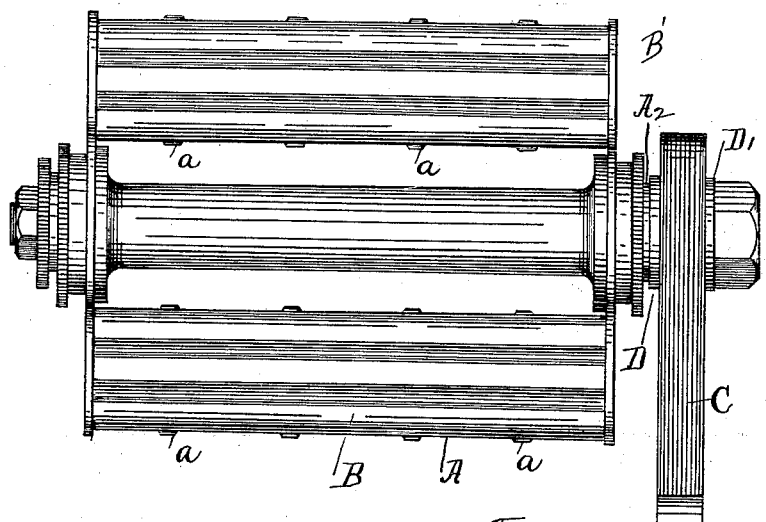
Figure 2:
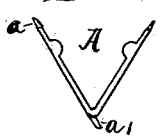
Figure 3:
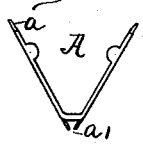
Figure 4:
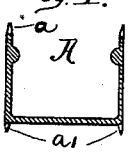
Figure 5:
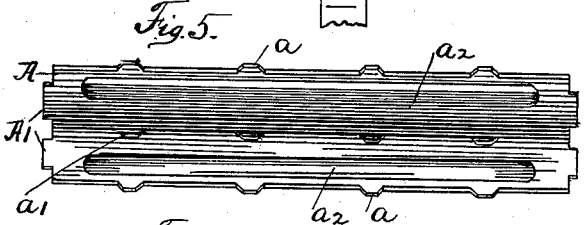
Figures 6, 7:
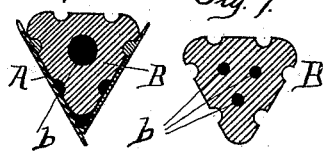
Figure 8:
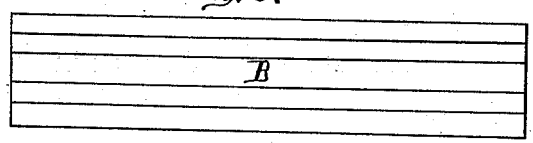
Figure 9:
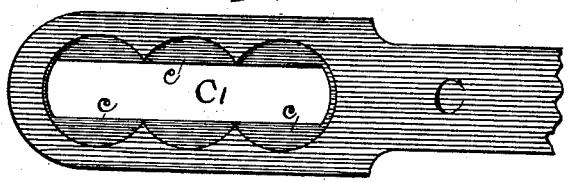

In the drawings, Figure 1 is a plan of a velocipede-pedal, showing my improvements. Figs. 2, 3, and 4 are vertical sections of the foot-support A, showing different forms thereof. Fig. 5 is a plan of the foot-support, as shown in Fig. 2. Fig. 6 is a vertical section of the foot-support A and foot-block B therein. Fig. 7 is a vertical section, and Fig. 8 a side elevation, of the foot-block B. Fig. 9 is a plan, and Fig. 10 is a vertical section, of the pedal end of the pedal-crank C. Fig. 11 is a vertical section, showing the method of securing the crank to the pedal-pin. Fig. 12 is a modification of same. Fig. 13 is a vertical section through the pedal, showing the foot of the rider thereon, the foot-blocks B being omitted from the foot-support. Fig. 14 is a perspective of a form of foot-support formed of a single flat piece of metal standing edgewise to the foot and corrugated longitudinally. Fig. 15 is a longitudinal section of the foot-block, showing air-cells therein.

A is the foot-support; B, the foot-block resting therein; $a$, projections on the edges of the foot-support; $a'$, projections at its angle or angles.

B' B' are the side plates of the pedal, through which the tongues A' of the foot-supports pass, whereby the supports are secured to the plates.

C is the pedal-crank, having the slot C' and the depressions $c$ in its surface. D is a shoulder on the pedal-pin $A^2$.

D' is a collar or washer on the pin outside the crank.

My invention relates to improvements in a velocipede-pedal, and includes means for lightening it and means whereby the contact of the rider's foot is retained; also, whereby the securement of the pedal-crank is effected so as to prevent the crank from slipping.

I form the foot-supports A of thin sheet metal in a polygonal trough-shaped form, having two, three, or more sides, as shown in Figs. 2, 3, and 4, secured to the side plates of the pedal by tongues A' on the supports A passing through them, and that the pedal may remain at any desired position as to its axis I place these supports so that they extend both above and below the medial horizontal plane of the pedal in such position that the pedal will be balanced by them, and not be caused by them to swing away from any position in which it is placed. The sides of these supports I provide with longitudinal corrugations $a^2$, to add strength and rigidity to them, which method of strengthening I also employ when a foot-support, formed of a single flat piece of metal standing edgewise to the foot, is used, as shown in Fig. 14.

Within the polygonal supports I place the foot-blocks B', formed of rubber or some other yielding material, having each an interior air space or spaces, $b$, for the sake of lightness. These blocks have longitudinal depressions corresponding to the corrugations on the supports into which the corrugations fit, whereby the blocks are secured to the supports. The corrugations on the supports may also be struck outward, and the blocks have corresponding ridges, which would then fit into the cavities made by the striking of the corrugations. By this method of securing the yielding foot-block I avoid the weakening occasioned by forming them with a longitudinal aperture to receive a bolt, as is commonly done, and am thus enabled to use a smaller amount of the material, thereby lightening the pedal. Moreover, I form the several sides of this foot-block with similar depressions or ridges, so that either side may be exposed to the rider's foot and the block secured by the other sides. The sides or angle of these polygonal foot supports may be used as a rest for the foot also, if desired, and I provide along their angle or angles a series of sharp projections to engage the shoe of the rider, whereby a "rat-trap" foot-rest is formed on this side of the support, so that the rider can use at his pleasure either the yielding block-rest or the rat-trap, which is preferred by many when riding at a high rate of speed. These projections are most easily formed by being struck up out of one of the sides forming the angle, which is also the preferable mode of forming them, for the reason that no weight is added to the pedal. At the edges, also, of the foot-supports I provide similar projections in the planes of the sides, so that the yielding block may be removed at any time, and the two foot-supports will form a rat-trap foot support having four lines of projections to engage the shoe. That these four lines of projections may all reach the shoe and form a perfect support for it, I form the projections on the inner side of each support slightly lower than the outer, making a rest conformed to the shape of the ball of the foot.

The advantages of the construction shown in my invention are—

Primarily, lightness, as it will be seen that the foot-support being polygonal and its sides corrugated very thin metal can be used and still the requisite strength be secured, thereby making a support much lighter than the solid bolt commonly used. Moreover, the rubber or other yielding foot-block, as already stated, is smaller in size than those used commonly where a bolt is used passing through them, and, as I form it with air-spaces within it, its weight is considerably less than those referred to.

Secondarily, convertibility, as the yielding block may be removed and a double rat-trap foot-rest remain. The block may also be turned around and a different face exposed to the foot at any time, if desirable; also, in the complete form, with the yielding block in position within the support, there are provided two different rests—the yielding one formed by the block, and a rat-trap formed by the projections at the angles of the support.

The portion of my invention relating to the pedal-crank and its securement to the crank-wrist, commonly called the "pedal-pin," consists in forming the crank with depressions in its surface which indent the margin of the slot C', and in providing the pedal-pin with a part which engages in such depression. In Fig. 11 this part is the shoulder D on the pin A', which engages in the depression c. In Fig. 12 the depressions are in the outer surface of the crank and engage with the collar or washer D'. In either case the same purpose is accomplished. The pin is prevented from slipping in the slot C' of the crank and the nut d could become quite loose, and the consequent looseness of the crank would give warning to the rider before the crank would slip up or down on the pin.

By providing the crank with several such depressions the pedal may be set at any one of several positions within the limits of the slot, and these depressions being similar in the two cranks the two pedals will be set accurately at the same distance from the axle of the wheel, so that the length of stroke will be uniform. The depressions are shown as circular, but their outline is not material, the only point being that the part on the pin which is to engage in the depressions be of similar shape.

I claim—

1. In a velocipede-pedal, in combination with the end pieces, polygonal trough shaped foot-supports secured rigidly thereto, each support having two or more edges exposed to the foot, substantially as set forth.

2. In a velocipede-pedal, a foot-support trough shaped and having its trough extending above and below the medial horizontal plane of the pedal and having two or more of its edges exposed to the foot, substantially as and for the purpose set forth.

3. In a velocipede-pedal, in combination with the end pieces, trough-shaped foot supports secured rigidly thereto and having projections upon two or more edges of each support for engaging the shoe of the rider, substantially as set forth.

4. In a velocipede, a pedal having trough-shaped foot-supports, having projections at the angle or angles for engaging the shoe of the rider, substantially as set forth.

5. In a velocipede, a pedal having trough-shaped foot-supports, each support having projections at two or more of its edges for engaging the shoe of the rider, substantially as set forth.

6. In a velocipede, a pedal having trough-shaped foot-supports, having projections at the edges and angle or angles for engaging the shoe of the rider, substantially as set forth.

7. In a velocipede, a pedal having trough-shaped foot-supports, having projections at the angle or angles projecting from one side and struck up out of the other, substantially as and for the purpose set forth.

8. In a velocipede, a pedal having trough-shaped metal foot-supports whose edges are provided with projections for engaging the shoe of the rider, the inner of said edges being lower than the outer, substantially as and for the purpose set forth.

9. In a velocipede, a pedal having metal foot-supports standing edgewise to the foot, strengthened by longitudinal corrugations, substantially as set forth.

10. In a velocipede, a pedal having trough-shaped foot-supports whose sides are strengthened by longitudinal corrugations, substantially as set forth.

11. In a velocipede-pedal, a yielding foot-block having an interior air space or spaces, and supported upon two or more of its outer faces, substantially as and for the purpose set forth.

12. In a velocipede-pedal, a yielding foot-block secured within a polygonal trough-shaped foot-support, substantially as set forth.

13. In a velocipede-pedal, a polygonal yielding foot-block having an interior air space or spaces and secured upon two or more of its outer faces to a polygonal trough-shaped foot-support, substantially as and for the purpose set forth.

14. In a velocipede-pedal, in combination with a foot-support which extends below the medial horizontal plane of the pedal, a yielding foot-block having an interior air space or spaces and secured upon two or more of its outer faces to the support, substantially as set forth.

15. In a velocipede-pedal, in combination with a foot-support which extends above and below the medial horizontal plane of the pedal, a polygonal yielding foot-block having an interior air space or spaces, and secured by two or more of its faces upon the support, substantially as set forth.

16. In a velocipede-pedal, in combination, a polygonal trough-shaped foot-support and a yielding foot-block, one having a projection or projections, and the other having a corresponding depression or depressions, whereby the foot-block is secured to the foot-support, substantially as set forth.

17. In a velocipede, in combination, a polygonal trough-shaped foot-support and a yielding foot-block, the latter having longitudinal depressions in two or more of its outer faces, and the former strengthened by inwardly-projecting longitudinal corrugations corresponding to the depressions in the foot-block, whereby the block is secured to the support, substantially as set forth.

18. In a velocipede-pedal, in combination with a polygonal trough-shaped foot-support strengthened by longitudinal corrugations, a polygonal yielding foot-block having on all of its faces similar longitudinal depressions adapted to engage with the corrugations of the foot-support, whereby any one side may be exposed to the rider's foot and the others secured to the foot-support, substantially as and for the purpose set forth.

In testimony whereof I have hereunto set my hand, in the presence of two witnesses, at Chicago, Illinois, this 7th day of October, 1887.

THOS. B. JEFFERY.

Attest:
CHAS. S. BURTON,
E. F. BURTON.